United States Patent
Pho et al.

(10) Patent No.: US 9,323,575 B1
(45) Date of Patent: Apr. 26, 2016

(54) SYSTEMS AND METHODS FOR IMPROVING DATA RESTORE OVERHEAD IN MULTI-TASKING ENVIRONMENTS

(71) Applicant: FREESCALE SEMICONDUCTOR, INC., Austin, TX (US)

(72) Inventors: Quyen Pho, Pflugerville, TX (US); Jimmy Gumulja, Austin, TX (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 0 days.

(21) Appl. No.: 14/632,568

(22) Filed: Feb. 26, 2015

(51) Int. Cl.
*G06F 9/46* (2006.01)
*G06F 9/50* (2006.01)
*G06F 9/48* (2006.01)
*G06F 9/52* (2006.01)

(52) U.S. Cl.
CPC ............ *G06F 9/5016* (2013.01); *G06F 9/4881* (2013.01); *G06F 9/52* (2013.01)

(58) Field of Classification Search
CPC .................................. G06F 9/52; G06F 9/4881
USPC .................................................. 718/104, 107
See application file for complete search history.

(56) References Cited

U.S. PATENT DOCUMENTS

| | | | | |
|---|---|---|---|---|
| 4,803,703 A | * | 2/1989 | DeLuca | H04W 88/026 370/350 |
| 6,047,308 A | * | 4/2000 | Grummer | H04M 3/00 709/200 |
| 6,272,520 B1 | * | 8/2001 | Sharangpani | G06F 9/3824 712/205 |
| 6,640,015 B1 | * | 10/2003 | Lafruit | H04N 19/63 382/240 |
| 6,986,141 B1 | * | 1/2006 | Diepstraten | G06F 9/4843 712/228 |
| 7,412,590 B2 | * | 8/2008 | Tomisawa | G06F 9/462 712/228 |
| 8,413,162 B1 | * | 4/2013 | Rozas | G06F 9/466 718/100 |
| 8,539,210 B2 | | 9/2013 | Julicher et al. | |
| 2003/0084096 A1 | * | 5/2003 | Starbuck | G06F 17/3089 709/203 |
| 2006/0101252 A1 | * | 5/2006 | Tomisawa | G06F 9/462 712/228 |
| 2007/0022428 A1 | | 1/2007 | Yamasaki | |

* cited by examiner

*Primary Examiner* — Phillip H Nguyen (57) ABSTRACT

A computer processing system includes a central processing unit (CPU) and logic instructions operable to, when a task ready to be scheduled for execution in the CPU (402) is the same as a task yielding to the task ready to be scheduled (406-Y), retain context information for the yielding task in background registers in the CPU, and move the context information for the yielding task directly from the background registers to foreground registers in the CPU for the task ready to be scheduled (410). The task ready to be scheduled is executed using the context information in the foreground registers (316).

20 Claims, 4 Drawing Sheets

SYSTEMS AND METHODS FOR IMPROVING DATA RESTORE OVERHEAD IN MULTI-TASKING ENVIRONMENTS

BACKGROUND

1. Field

This disclosure relates generally to multi-tasking core environments, and more specifically, to systems and methods for improving data restore overhead in multi-tasking environments.

2. Related Art

In processing systems in which processing resources make use of multi-tasking capabilities, different schemes may be used to manage the scheduling associated with executing multiple tasks. The degree of difficulty in multitasking management may be directly related to the number of tasks that may be under management at any given time.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

One scheme that may be employed in managing multiple tasks may make use of a separation of logic capabilities. For example, processing logic may be responsible for executing the appropriate task at the appropriate time while scheduling logic may be responsible for determining the appropriate task and determining the appropriate time.

In some embodiments, a processing system may need to schedule any number of tasks (e.g., 8, 16, 32, 64, 128, etc.) that may compete for execution by the processing the logic. In some embodiments, the number of tasks may be divided among a plurality of processing logic units (e.g., multiple cores within a single processor chip). Due to the potentially large number of tasks that need scheduling, scheduling logic may need to include a correspondingly high level of complexity in order to efficiently schedule all tasks.

However, all task scheduling may not be equal in terms of the data needed by the processing logic at any given moment. For example, it may be that only a relatively small number of tasks (e.g., one or two tasks) are required of the processing logic at a given time. This may be because a relatively small number of tasks are running at a given time, or it may be because a relatively small number of tasks have a high priority at a given time and thus other tasks must wait for the relatively small number of tasks to complete.

Due to the requirement to accommodate the high number of tasks, however, a processing system may treat all scheduling the same regardless of current processing needs. For example, as described in more detail below with reference to FIGS. 1-4, scheduling logic may implement a full restoration of saved data when a previously yielded task returns for processing even when such a full restoration may not be necessary.

Figure 1:
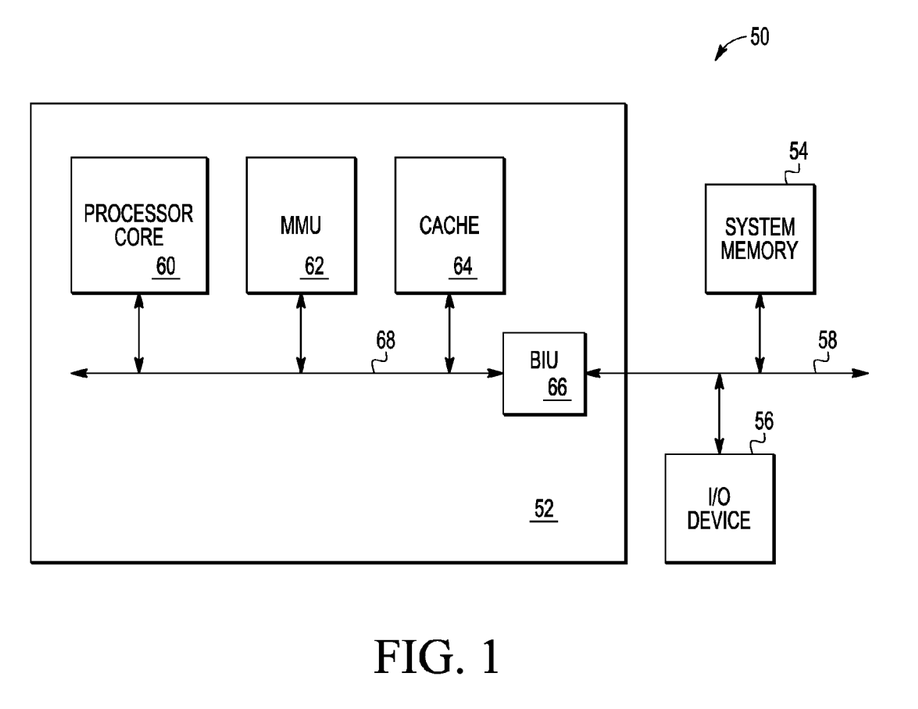
FIG. 1 illustrates an example processing system for improving data restore overhead in a multitasking environment, in accordance with certain embodiments of the present disclosure.

FIG. 1 illustrates an example processing system 50 for improving data restore overhead in a multitasking environment, in accordance with certain embodiments of the present disclosure. In some embodiments, FIG. 1 may include one or more processing device(s) 52, one or more system memory device(s) 54 (e.g., random access memory), and one or more input/output device(s) 56 connected via bus 58. Processing device 52 may include one or more processor core(s) 60, one or more memory management unit(s) ("MMU") 62, one or more cache memory 64, and one or more bus interface unit(s) ("BIU") 66 interconnected via bus 68, whereby BIU 66 may serve as an interface between bus 68 and bus 58.

In operation, processing device 52 may execute instructions using processor core 60, whereby instruction data and operand data may be accessed from cache 64, system memory device 54, I/O device 56, and/or another source. Data resulting from the execution of the instructions can be provided for storage in system memory device 54 and/or provided to I/O device 56 via BIU 66. In order to expedite memory accesses to devices external to processing device 52 (e.g., system memory device 54 and/or I/O device 56), cache 64 can be used to cache instruction data and/or related data.

Figure 2:
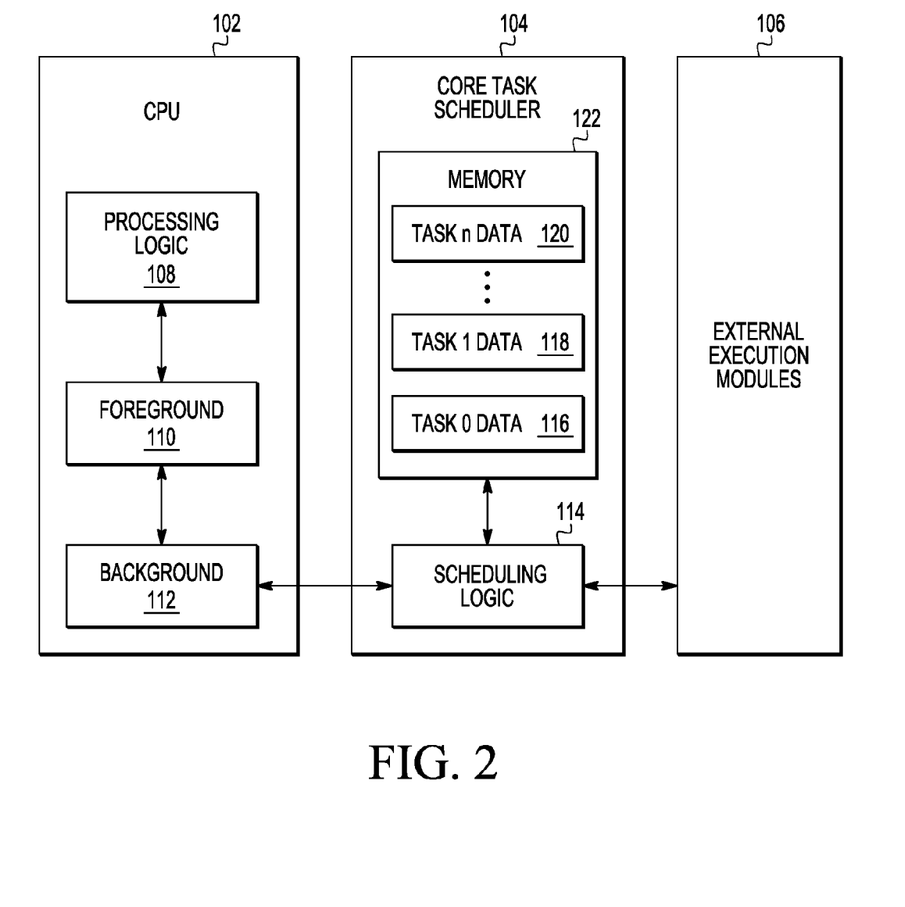
FIG. 2 illustrates an example logic architecture for improving data restore overhead in a multitasking environment, in accordance with certain embodiments of the present disclosure.

FIG. 2 illustrates an example logic architecture 100 for improving data restore overhead in a multitasking environment, in accordance with certain embodiments of the present disclosure. In some embodiments, FIG. 2 may include one or more central processing unit(s) ("CPU" or "CPUs") 102 communicatively coupled to one or more core task scheduler(s) ("CTS") 104, communicatively coupled to one or more external execution modules 106.

In some embodiments, CPU 102 and CTS 104 may be executed by the same processor core 60 illustrated in FIG. 1. In the same or alternative embodiments, CPU 102 and CTS 104 may be executed by different cores 60 and/or by different processing devices 52 and/or by different processing systems 50.

In some embodiments, CPU 102 may include processing logic 108 communicatively coupled to foreground memory 110, which may then be communicatively coupled to background memory 112. Processing logic 108 may be any appropriate component and/or collection of components within processor core 60 operable to execute tasks scheduled by CTS 104. For example, processing logic 108 may be a set of processing resources within processor core 60 operable to execute a series of instructions stored in cache 64 and/or system memory 54. Foreground memory 110 may be any memory operable to store instructions and/or data associated with a task that may be executed by processing logic 108. For example, as described in more detail below and with reference to FIGS. 2-4, foreground memory 110 may include data associated with a task currently being executed by processing logic 108.

In some embodiments, CPU 102 may also include background memory 112 communicatively coupled to foreground memory 110. Background memory 112 may be any memory operable to store instructions and/or data associated with a task that has recently yielded its execution by processing logic 108, as described in more detail below and with reference to FIGS. 2-4. Background memory 112 may also be communicatively coupled to scheduling logic 114 of CTS 104. As described in more detail below, and with reference to FIGS. 2-4, scheduling logic 114 may be operable to write data to background memory 112 in accordance with a task schedule.

In some embodiments, scheduling logic 114 may be part of CTS 104. CTS 104 may also include memory 122 communicatively coupled to scheduling logic 114. Memory 122 may include a plurality of data blocks 116, 118, 120, with each data block associated with a task that may be scheduled. For example, if processing device 52 may be responsible for scheduling up to sixteen tasks, then memory 122 may include sixteen data blocks, with one for each task. Thus, although three data block 116, 118, 120 are illustrated, more, fewer, and/or different numbers of data blocks may be present without departing from the scope of the present disclosure.

In some embodiments, scheduling logic 114 may be operable to save data from background memory 112 to memory 122 and/or to restore data from memory 122 to background memory 112.

In some configurations of CTS 104, each data block 116, 118, 120 may include a plurality of data "entries" or "banks" associated with each task. As an illustrative example only, a core complex (e.g., a plurality of processing devices 52) may include CPU 102 and CTS 104 (e.g., implemented on a single core 60) operable to support up to sixteen tasks. A context register set may have approximately forty 32-bit registers. CTS 104 may use a pair of memory instances (e.g., two of memory 122) of size 80×138 to store the context data. Each task may take five entries, with four registers per entry in each memory instance (e.g., each memory 122). As a result, it may take more than five clock cycles to transfer the data associated with a given task to and/or from CTS 104 (e.g., five to save data from CPU 102 to CTS 104 and six to restore data to CPU 102 from CTS 104).

In some embodiments, scheduling logic 114 may be further operable to communicate with a plurality of external execution modules 106. External execution modules 106 may include accelerators, additional scheduling logic, and/or any other appropriate module responsible for some portion of the task's scheduling and/or execution. For example, a task being executed on processing logic 108 may yield in order to continue execution on an accelerator. As an additional example, scheduling logic 114 may communicate with an ordering scope manager ("OSM") in order to receive and/or communicate additional information regarding the scheduling of tasks.

In operation, processing logic 108 may be operable to execute a current task (e.g., task 0). Processing logic 108 may be communicatively coupled to foreground memory 110 and not background memory 112. Thus, processing logic 108 may be operable to execute a current task only when data associated with that task is loaded into foreground memory 110 (along with potentially other conditions, as described in more detail below). When the currently executing task is ready to yield control of processing logic 108 to another task (e.g., the task includes a break point such as a call to an accelerator, a command to an OSM, or other yield command), the data associated with the currently executing task may be moved from foreground memory 110 to background memory 112 while the data associated with the next task to be executed (e.g., task 1) may be moved from background memory 112 to foreground memory 110, and execution of the next task (e.g., task 1) may commence.

Scheduling logic 114 may be operable to retrieve data from background memory 112 in order to store the data (e.g., context data associated with the task that yielded) in the appropriate data block (e.g., the one of data block 116, 118, 120 associated with the task that yielded). As described in the illustrative example above, this may include a full write of all data associated with the yielded task and may take as many clock cycles (or more) as there are data banks associated with the task.

Scheduling logic 114 may also be operable to prepare the next scheduled task (e.g., task 2) for execution by CPU 102. This may include communicating data associated with the next scheduled task (e.g., task 2) from memory 122 to background memory 112. As described in more detail below with reference to FIGS. 2-4, the data communicated to background memory 112 may vary depending on whether the next scheduled task is the same as the previously yielding task (e.g., task 0). When they are not the same (e.g., when the data currently in background memory 112 is not associated with the same task as the data to be moved into background memory 112), then scheduling logic 114 may communicate a full restore of all data associated with the next scheduled task.

However, when they are the same (e.g., when the data currently in background memory 112 is associated with the same task as the data to be moved into background memory 112), then scheduling logic 114 may communicate some or none of the data associated with that task to background 112. For example, scheduling logic 114 may only communicate a subset of the data banks associated with the task to background memory 112. As an illustrative example, the only data that may have changed for a given task is a context state (e.g., ready for processing, waiting for processing, etc.). Data associated with the context state may only be stored in one register, which may only require communicating one data bank (rather than all data banks) associated with the task. In other configurations, more, fewer, or different data may be changed and/or communicated without departing from the scope of the present disclosure.

A situation in which the data are the same may occur, for example, when only one or two tasks are executing. The situation may also occur, for example, when one or two tasks have a higher (or substantially higher) priority than all other tasks, thus resulting in CPU 102 effectively executing only those one or two tasks.

When the data stored in background 112 is associated with the same task as the previously yielding task, there may be some delay and processing logic 108 may not be operable to immediately resume execution of the task. For example, processing logic 108 may have a plurality of cycles of unproductive or stall time while waiting for context data to load into the appropriate memory 110, 112.

In some embodiments, scheduling logic 114 may be any appropriate component, components, or other logic implementation operable to schedule tasks for execution by processing logic 108 in such a manner as to optimize the number of full stores and/or restores required by system 100. For example, scheduling logic 114 may be operable to use information in background memory 112 for a given task to be executed by processing logic 108 (e.g., ready to be scheduled) without replacing the information in background memory 112 with information from memory 122 when certain conditions are met. In some embodiments, those conditions may be: (1) when the task ready to be scheduled has data associated with that task already stored in background memory 122, and (2) when an identifier of the task ready to be scheduled is the same as an identifier of a yielding task. If neither condition is met, scheduling logic 114 may take an appropriate action, including waiting until the information in background memory 112 is associated with the task ready to be scheduled (e.g., periodic checking), replacing the information in background memory 112 with data from memory 122, etc.

In some embodiments, scheduling logic 114 may be further operable to set an identifier associated with background memory 112. For example, scheduling logic 114 may be operable to set a "background valid indicator" for the data in background memory 112 when an identifier associated with the task ready to be scheduled is the same as an identifier of the yielding task. In some embodiments, the identifier associated with background memory 112 may be set to a first state when all of the data for a task ready to be scheduled has been restored to background memory 112, wherein the identifier may be communicated to (and/or received by) processing logic 108 such that processing logic 108 may execute the task ready to be scheduled once the indicator is set to the first state.

As described in more detail below with reference to FIGS. 3-4, in the same or alternative embodiments, scheduling logic 114 may be operable to push data in foreground memory 110 to background memory 112 when a task is yielding. Scheduling logic 114 may, in some embodiments, be further operable to pull information from background memory 112 to foreground memory 110. Scheduling logic 114 may be further operable to store data associated with background memory 112 to memory 122.

Figure 3:
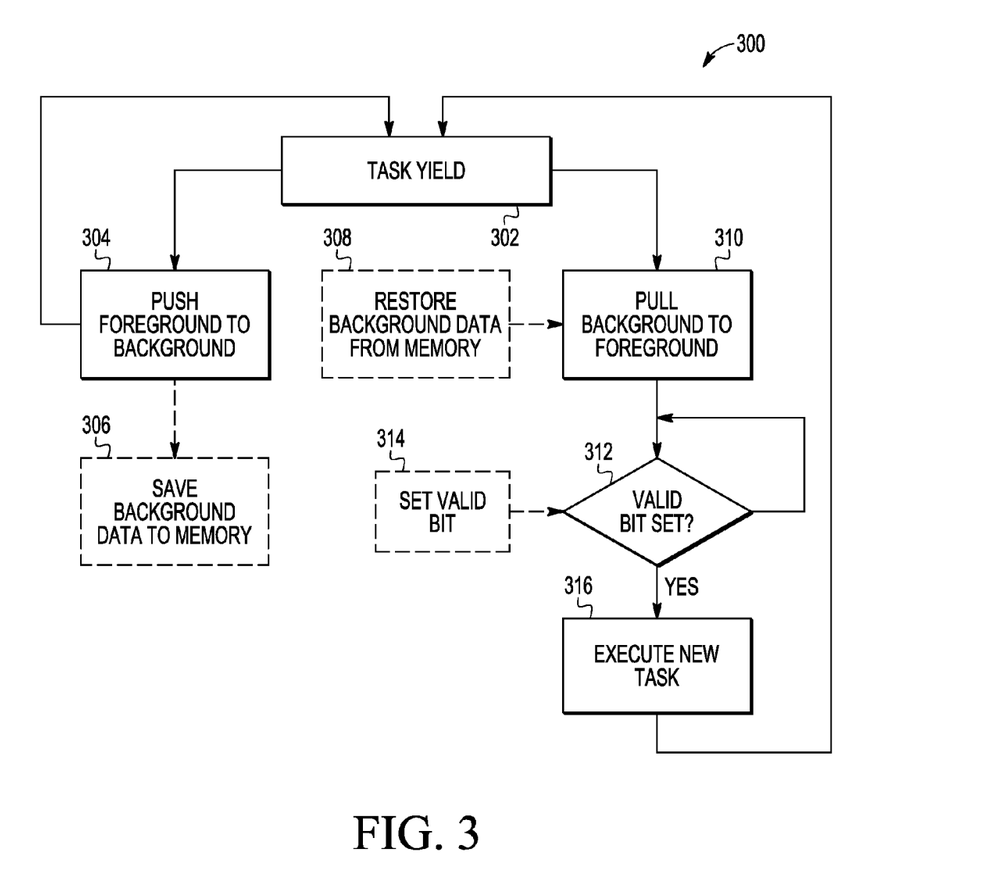
FIG. 3 illustrates a flowchart of an example method for scheduling tasks for execution in a processing environment, in accordance with certain embodiments of the present disclosure.

FIG. 3 illustrates a flowchart of an example method 300 for scheduling tasks for execution in a processing environment, in accordance with certain embodiments of the present disclosure. In some embodiments, method 300 includes 302-316, although in the same or alternative embodiments method 300 may include more, fewer, or different processes than those illustrated in FIG. 3, as described in more detail below. Although the description of FIG. 3 begins at 302, method 300 may begin at other points without departing from the scope of the present disclosure.

In some embodiments, certain portions of method 300 may be undertaken by different portions of system 100. For example, processing logic 108 may be responsible for managing and/or executing 302, 304, 310, 312, 316 (e.g., the processes illustrated in the solid line-shapes), while scheduling logic 114 may be responsible for managing and/or executing 306, 308, 314 (e.g., the processes illustrated in the dotted line-shapes). Although this particular configuration is illustrated in FIG. 3, other configurations may be implemented without departing from the scope of the present disclosure. For example, one set of processing logic may be responsible for managing and/or executing all of method 300. As another example, a third set of logic may be responsible for managing and/or executing the background data memory transfers (e.g., at 306, 308).

At 302, system 100 may have a task that is ready to yield to another task to be scheduled. As described in more detail above with reference to FIGS. 1-2, this may occur when processing logic 108 may be more efficiently used by a second task. Once a task is ready to yield, method 300 may pull data from background memory 112 to foreground memory 110 (e.g., at 310) and push data from foreground memory 110 to background memory 112 (e.g., at 304). Although the movement of data at 304, 310 are illustrated as occurring simultaneously, in some configurations of method 300, these data transfers may occur sequentially (e.g., involving a third memory), or some combination of simultaneous and sequential transfer.

Once data has been pushed from foreground memory 110 to background memory 112, the data in background memory 112 may be saved to memory 112 (e.g., at 306). Occurring at the same and/or a later time, method 300 may return to 302 to await the now-executing task yielding control of processing logic 108.

Prior to data being pulled from background 112 to foreground 110, the data must be restored to background 112 from memory 122 (e.g., at 308). This restored data may then be pulled to foreground memory 110 (e.g., at 310). Once the data has been pulled to foreground memory 110, method 300 may determine (e.g., at 312) whether an indicator associated with background memory 110 is in an appropriate state (e.g., a first state as described in more detail above with reference to FIG. 2). For example, the indicator may be a valid bit set by scheduling logic 114 (e.g., at 314). If the valid bit is set, method 300 may proceed to execute the task to be schedule (e.g., at 316), returning to 302 to await the now-executing task to yield control of processing logic 108. If the valid bit is not set, method 300 may perform periodic checks of the valid bit to determine when to proceed. As described in more detail below with reference to FIG. 4, the valid bit be set either when an identifier for the task to be scheduled is the same as the yielding task (and thus no full restore of the background data is necessary) or after a full restore has been performed.

Figure 4:
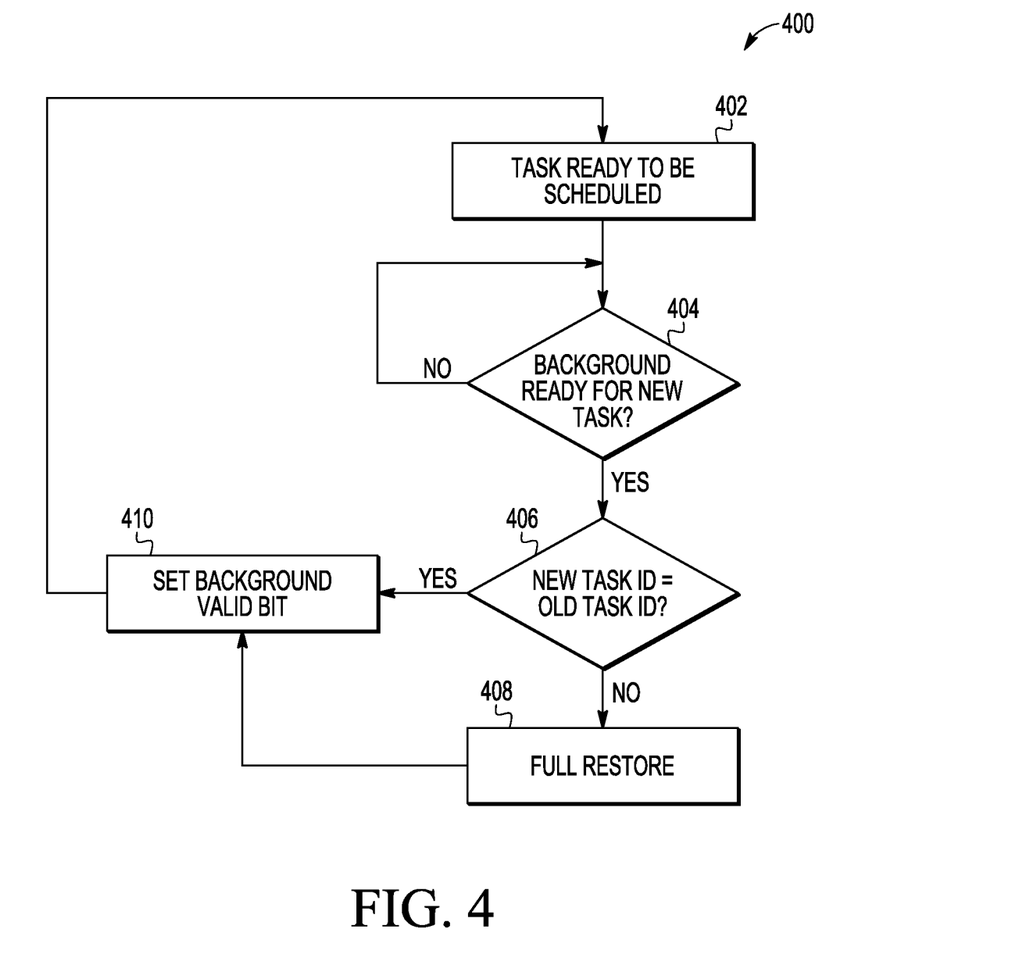
FIG. 4 illustrates a flow chart of an example method for setting an identifier associated with background memory, in accordance with certain embodiments of the present disclosure.

FIG. 4 illustrates a flow chart of an example method 400 for setting an identifier associated with background memory 112, in accordance with certain embodiments of the present disclosure. In some embodiments, method 400 includes 402-410, although in the same or alternative embodiments method 400 may include more, fewer, or different processes than those illustrated in FIG. 4, as described in more detail below. Although the description of FIG. 4 begins at 402, method 400 may begin at other points without departing from the scope of the present disclosure. In some embodiments, method 400 may be performed by some or all of scheduling logic 114, as described in more detail above with reference to FIGS. 1-3.

In some embodiments, method 400 may determine that a task is ready to be scheduled (e.g., at 402). When a task is ready to be scheduled, method 400 may determine (e.g., at 404) whether the data stored in background memory 112 is ready for the task to be scheduled. If not, method 400 may perform periodic checks to determine whether background memory 112 is ready for the task to be scheduled. If background memory 112 is ready, method 400 may determine (e.g., at 406) whether an identifier associated with the task to be scheduled is the same as an identifier associated with the yielding task. If it is, method 400 may set the identifier associated with background memory 112 (e.g., the background valid bit at 410). If not, method 400 may initiate a full restore of data from memory 122 to background memory 112 before setting the identifier associated with background memory 112 (e.g., the background valid bit at 410). In some embodiments, method 400 may include additional processes. For example, the full restore of data at 408 may require a plurality of processes to complete.

By now it should be appreciated that there has been provided systems and methods for improving data restore overhead in multi-tasking environments. As described above, the reduction in data communicated to background memory 112 may result in a reduction of overhead and a resultant improvement in the performance of architecture 100. For example, if scheduling logic 114 need only communicate one data bank rather than five, only one clock cycle (rather than five) may be needed for the data transfer, thus reducing the delay time. As an additional example, if the yielding task and the task to be scheduled are the same task, the data in foreground memory 110 and background memory 112 may be switched on the same cycle as the initial check, thus reducing the delay time.

In some embodiments, what is provided is a computer processing system 100 that may include a processor core 102. Processor core 102 may include a central processing unit (CPU) 108 configured to execute one or more tasks, a core task scheduler (CTS) 104 coupled to communicate with the CPU; a memory 122 associated with the CTS, a set of foreground context registers 110 accessible by the CPU, a set of background context registers 112 accessible by the CPU and the CTS, and logic instructions 108, 114 operable to use the information in the background context registers for the task without replacing the information in the background context registers with information from the memory associated with the CTS when: (i) a task is ready to be scheduled and the information in the background context registers is associated with the task ready to be scheduled 402, 404, and (ii) when an identifier of the task ready to be scheduled is the same as an identifier of a yielding task 406-Y.

In some embodiments, the logic instructions may be operable to, when the task is ready to be scheduled, wait until the information in the background context registers is associated with the task ready to be scheduled 404-N. When the identifier of the task ready to be scheduled is not the same as the identifier of the yielding task, the logic instructions may also be operable to replace the information in the background context registers with the information from the memory associated with the CTS 408.

The logic instructions may further be operable to set a background valid indicator for the information in the background context registers when the identifier of the task ready to be scheduled is the same as the identifier of the yielding task 410. When a task is yielding, the logic instructions may push information in the foreground registers to the background registers 304. They may also, when the task is yielding, pull information in the background registers to the foreground registers 310.

In some embodiments, when the task is yielding, the logic instructions may be further operable to save the information in the background registers to the memory associated with the CTS 306. They may be further operable in such a situation to set a background valid indicator to a first state when all of the information for the task ready to be scheduled has been restored to the background registers 314. They may then be operable to execute the task ready to be scheduled when the background valid indicator is set to the first state 312, 316.

A method of performing a context switch in a computer processing system is also disclosed. The method may include: when a task ready to be scheduled for execution in a central processing unit (CPU) 402 is the same as a task yielding to the task ready to be scheduled 406-Y, retaining context information for the yielding task in background registers in the CPU, moving the context information for the yielding task directly from the background registers in the CPU to foreground registers in the CPU for the task ready to be scheduled 410; when the task ready to be scheduled for execution 402 is not the same as the task yielding to the task ready to be scheduled 406-N, moving the context information for the task ready to be scheduled from memory associated with a core task scheduler (CTS) in the processing system to the background registers in the CPU and then to the foreground registers in the CPU once the yielding task has yielded; and executing the task ready to be scheduled using the context information in the foreground registers 316.

In some embodiments, the method may also include saving the context information in the background registers to the memory associated with the CTS once the task ready to be scheduled is ready to be executed. In some embodiments, the method may also include setting a valid indicator to a first state for the context information in the background registers when the task ready to be scheduled is the same as a task yielding to the task ready to be scheduled, wherein the valid indicator is set before the context information for the yielding task is loaded to the foreground registers. In some embodiments, the method may also include waiting until the valid indicator is in the first state before loading the context information from the background registers to the foreground registers.

In still other embodiments, a computer processing system may include a central processing unit (CPU); logic instructions operable to: when a task ready to be scheduled for execution in the CPU 402 is the same as a task yielding to the task ready to be scheduled 406-Y, retain context information for the yielding task in background registers in the CPU, move the context information for the yielding task directly from the background registers to foreground registers in the CPU for the task ready to be scheduled 410; execute the task ready to be scheduled using the context information in the foreground registers 316.

In some embodiments, this processing system may further include a core task scheduler (CTS) 104; a memory associated with the CTS 122; and logic instructions operable to: when the task ready to be scheduled for execution 402 is not the same as the task yielding to the task ready to be scheduled 406-N, move the context information for the task ready to be scheduled from the memory associated with the CTS in the processing system to the background registers in the CPU and then to the foreground registers in the CPU once the yielding task has yielded 408.

The logic instructions may be further operable to save the context information in the background registers to the memory associated with the CTS once the task ready to be scheduled is ready to be executed. The logic instructions may be still further operable to set a valid indicator 410 to a first state for the context information in the background registers when the task ready to be scheduled is the same as the task yielding to the task ready to be scheduled, wherein the valid indicator is set before the context information for the yielding task is loaded to the foreground registers.

The logic instructions may be operable to, when a task is yielding, push information in the foreground registers to the background registers 304; or when the task is yielding, pull information in the background registers to the foreground registers 310. In the latter circumstance, the logic instructions may also be operable to wait to execute the task ready to be scheduled until the background valid indicator is set to the first state 312, 316.

In processing systems in which processing resources make use of multi-tasking capabilities, different schemes may be used to manage the scheduling associated with executing multiple tasks.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, more, fewer, or different data registers may be used for the plurality of tasks to be scheduled by core task scheduler 104. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

What is claimed is:

1. A computer processing system comprising:
   a processor core including:
      a central processing unit (CPU) configured to execute one or more tasks;
      a core task scheduler (CTS) coupled to communicate with the CPU;
      a memory associated with the CTS;
      a set of foreground context registers accessible by the CPU;
      a set of background context registers accessible by the CPU and the CTS;
      logic instructions operable to:
         when a task is ready to be scheduled and the information in the background context registers is associated with the task ready to be scheduled, and when an identifier of the task ready to be scheduled is the same as an identifier of a yielding task, using the information in the background context registers for the task without replacing the information in the background context registers with information from the memory associated with the CTS.

2. The processing system of claim 1, further comprising:
   logic instructions operable to:
      when the task is ready to be scheduled, wait until the information in the background context registers is associated with the task ready to be scheduled.

3. The processing system of claim 1, wherein when the identifier of the task ready to be scheduled is not the same as the identifier of the yielding task, replace the information in the background context registers with the information from the memory associated with the CTS.

4. The processing system of claim 1, further comprising:
   logic instructions operable to set a background valid indicator for the information in the background context registers when the identifier of the task ready to be scheduled is the same as the identifier of the yielding task.

5. The processing system of claim 1, further comprising:
   logic instructions operable to, when a task is yielding, push information in the foreground registers to the background registers.

6. The processing system of claim 5, further comprising:
   logic instructions operable to, when the task is yielding, pull information in the background registers to the foreground registers.

7. The processing system of claim 6, further comprising:
   logic instructions operable to, when the task is yielding, save the information in the background registers to the memory associated with the CTS.

8. The processing system of claim 5, further comprising:
   logic instructions operable to, when the task is yielding, set a background valid indicator to a first state when all of the information for the task ready to be scheduled has been restored to the background registers.

9. The processing system of claim 1, further comprising:
   logic instructions operable to execute the task ready to be scheduled when the background valid indicator is set to the first state.

10. A method of performing a context switch in a computer processing system comprising:
    when a task ready to be scheduled for execution in a central processing unit (CPU) is the same as a task yielding to the task ready to be scheduled, retaining context information for the yielding task in background registers in the CPU, moving the context information for the yielding task directly from the background registers in the CPU to foreground registers in the CPU for the task ready to be scheduled;
    when the task ready to be scheduled for execution is not the same as the task yielding to the task ready to be scheduled, moving the context information for the task ready to be scheduled from memory associated with a core task scheduler (CTS) in the processing system to the background registers in the CPU and then to the foreground registers in the CPU once the yielding task has yielded; and
    executing the task ready to be scheduled using the context information in the foreground registers.

11. The method of claim 10, further comprising:
    saving the context information in the background registers to the memory associated with the CTS once the task ready to be scheduled is ready to be executed.

12. The method of claim 10, further comprising:
    setting a valid indicator to a first state for the context information in the background registers when the task ready to be scheduled is the same as a task yielding to the task ready to be scheduled, wherein the valid indicator is set before the context information for the yielding task is loaded to the foreground registers.

13. The method of claim 10, further comprising:
waiting until the valid indicator is in the first state before loading the context information from the background registers to the foreground registers.

14. A computer processing system comprising:
a central processing unit (CPU);
logic instructions operable to:
  when a task ready to be scheduled for execution in the CPU is the same as a task yielding to the task ready to be scheduled,
    retain context information for the yielding task in background registers in the CPU,
    move the context information for the yielding task directly from the background registers to foreground registers in the CPU for the task ready to be scheduled;
  execute the task ready to be scheduled using the context information in the foreground registers.

15. The processing system of claim 14, further comprising:
a core task scheduler (CTS);
a memory associated with the CTS;
logic instructions operable to:
  when the task ready to be scheduled for execution is not the same as the task yielding to the task ready to be scheduled, move the context information for the task ready to be scheduled from the memory associated with the CTS in the processing system to the background registers in the CPU and then to the foreground registers in the CPU once the yielding task has yielded.

16. The processing system of claim 14, further comprising:
logic instructions operable to:
  save the context information in the background registers to the memory associated with the CTS once the task ready to be scheduled is ready to be executed.

17. The processing system of claim 14, further comprising:
logic instructions operable to:
  set a valid indicator to a first state for the context information in the background registers when the task ready to be scheduled is the same as the task yielding to the task ready to be scheduled, wherein the valid indicator is set before the context information for the yielding task is loaded to the foreground registers.

18. The processing system of claim 14, further comprising:
logic instructions operable to, when a task is yielding, push information in the foreground registers to the background registers.

19. The processing system of claim 14, further comprising:
logic instructions operable to, when the task is yielding, pull information in the background registers to the foreground registers.

20. The processing system of claim 17, further comprising:
logic instructions operable to wait to execute the task ready to be scheduled until the background valid indicator is set to the first state.

* * * * *